(12) United States Patent
Naven et al.

(10) Patent No.: US 6,810,043 B1
(45) Date of Patent: Oct. 26, 2004

(54) SCHEDULING CIRCUITRY AND METHODS

(75) Inventors: Finbar Naven, Cheshire (GB); Paul Barnes, Derbyshire (GB); Simon Timothy Smith, Manchester (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/304,843

(22) Filed: May 5, 1999

(30) Foreign Application Priority Data

May 11, 1998 (GB) .............................................. 9810089

(51) Int. Cl.$^7$ .......................... H04L 12/56; H04L 12/54
(52) U.S. Cl. ................ 370/412; 370/395.4; 370/395.71
(58) Field of Search .............................. 370/230.1, 231, 370/235, 395.4, 395.71, 314, 412–418; 709/206, 209, 211; 707/10, 104.1, 200

(56) References Cited

U.S. PATENT DOCUMENTS

| | | | | |
|---|---|---|---|---|
| 5,519,507 A | * | 5/1996 | Subramaniam et al. ...... | 358/402 |
| 5,535,201 A | | 7/1996 | Zheng ..................... | 370/230.1 |
| 5,734,650 A | | 3/1998 | Hayter et al. ............... | 370/391 |
| 5,835,494 A | * | 11/1998 | Hughes et al. .............. | 370/397 |
| 5,850,399 A | * | 12/1998 | Ganmukhi et al. .......... | 370/412 |
| 6,041,059 A | * | 3/2000 | Joffe et al. .................... | 370/412 |
| 6,091,709 A | * | 7/2000 | Harrison et al. ............. | 370/235 |
| 6,134,217 A | * | 10/2000 | Stiliadis et al. ............. | 370/232 |
| 6,263,359 B1 | * | 7/2001 | Fong et al. .................. | 718/103 |
| 6,490,251 B2 | * | 12/2002 | Yin et al. ................. | 370/236.1 |

FOREIGN PATENT DOCUMENTS

| | | |
|---|---|---|
| EP | 0 702 472 | 3/1996 |
| GB | 2 293 720 | 4/1996 |
| WO | 97/22195 | 6/1997 |

* cited by examiner

Primary Examiner—Dang Ton
Assistant Examiner—Ronald Abelson
(74) Attorney, Agent, or Firm—Staas & Halsey LLP

(57) ABSTRACT

Scheduling circuitry, for use for example in an ATM network unit to schedule cell transmissions, includes a master calendar (1) for holding entries corresponding respectively to events (cell transmissions) that are to occur within a preselected master-calendar scheduling range (SR), and a slave calendar (12) for holding entries corresponding respectively to events that are to occur beyond that scheduling range. When an event is to be scheduled, calendar control circuitry (24) makes an entry corresponding thereto in the slave calendar (12) if the interval between a current time and a desired scheduling time for the event exceeds said scheduling range. The entry in the slave calendar includes timing information representing the desired scheduling time. The calendar control circuitry monitors the entries in the slave calendar (12) and causes an entry therein whose corresponding event becomes within the scheduling range to be transferred to the master calendar (1).

Such scheduling circuitry can deal effectively with events that are to be scheduled at widely disparate intervals (very short and very long) without requiring the calendars to be large and without complicated processing of the calendar entries.

29 Claims, 11 Drawing Sheets

SCHEDULING CIRCUITRY AND METHODS

BACKGROUND OF THE INVENTION

1. Field of the Invention

The present invention relates to scheduling circuitry and methods for use, for example, in scheduling cell transmission operations in an asynchronous transfer mode (ATM) communications network.

2. Description of the Related Art

In an ATM communications network a plurality of so-called "virtual channels" (VCs) are used to transmit user data and control information between different network units. Such user data and control information is transmitted in the form of ATM cells, each cell having a header portion, containing control and addressing information for the cell, and a payload portion containing the user data or other control information.

A given network unit may have a plurality of such virtual channels connecting it to one or more other units of the network. It is therefore necessary to provide, in each network unit, a traffic manager that manages the times at which cells are caused to be applied to the different virtual channels concerned.

The task of the traffic manager is complicated by the fact that different virtual channels may be used to transmit different types of traffic, including traffic types having different so-called priorities. For example, the following types of traffic may occur in ATM networks:

i) Constant bit rate (CBR) traffic. This is typically used for high-priority data which should not be subject to delays, for example video signals.

ii) Variable bit rate (VBR) traffic. This type of traffic also has a relatively high priority (but lower than CBR traffic). It is used where some tolerance to delay is available, for example compressed video (e.g. Motion Picture Expert Group MPEG2) traffic or voice traffic.

iii) Available bit rate (ABR) traffic. A virtual channel used to transmit ABR traffic has traffic parameters that are agreed between the user of the channel and the network operator. Within the limitations imposed by the agreed parameters, the ABR channel is permitted to vary its transmission rate so as to take advantage of spare capacity in the network. ABR traffic has a low priority (lower than CBR and VBR traffic). ABR channels may be used, for example, for file and data transfers.

iv) Unspecified bit rate (UBR) traffic, for example e-mail and some types of data/file transfers.

FIG. 1 of the accompanying drawings is a schematic block diagram for use in explaining a "calendar" scheduling method proposed previously for managing the cell transmission times from an ATM network unit.

In FIG. 1, a calendar 1 is made up of a list of storage locations 2 corresponding respectively to a succession of time slots. The duration of each time slot is equal to the time taken to transmit a single ATM cell at the maximum required data rate of the ATM network.

Each storage location 2 is capable of storing one or more entries, each such entry denoting that a specified virtual channel is to be serviced by the traffic manager in the time slot to which the storage location corresponds. For example, a storage location $2_A$ in the calendar 1 has a single entry denoting that the virtual channel VCw is to be serviced by the traffic manager in the time slot corresponding to the storage location $2_A$.

It is possible for more than one VC to be entered into the same storage location. For example, a storage location $2_B$ in the calendar 1 has three virtual channels VCx, VCy and VCz entered therein, denoting that each of these channels is to be serviced in the time slot corresponding to the storage location $2_B$. The three entries in the storage location $2_B$ are made in the form of a linked list, so as to avoid reserving large amounts of memory per time slot to attempt to accommodate the largest possible number of VCs which could accumulate at a particular storage location.

The traffic manager uses two pointers 3 and 4 to process the calendar 1. The first of these pointers 3 is a current time pointer (T) which represents real time. The current time pointer T is always incremented after each cell interval. The second pointer 4 is an activity pointer (A) which is always attempting to catch up with the T pointer 3, without ever being incremented past it.

At each storage location 2 in the calendar 1, if no VCs are entered, the A pointer is simply incremented to the next storage location, so that in this case the A pointer will tend to catch up to the T pointer. If, on the other hand, one or more VCs is entered at a storage location pointed to by the A pointer, the pointer is not incremented until all the VCs have been processed (in this case the T pointer will be incremented more than once during the time required to process all the VCs concerned, so that the A pointer will tend to fall further behind the T pointer).

The traffic manager services the entries in the calendar as follows. Firstly, a cell for the VC specified in the entry is transmitted. Secondly, if necessary, a new inter-cell interval for the channel is calculated (CBR channels always have the same inter-cell interval but for VBR, ABR and UBR channels the cell interval can vary in use of the channel and so must be recalculated from time to time). The next cell transmission for the specified VC is then rescheduled by making a new entry for the VC in a different storage location 2 of the calendar 1.

For example, if VCx has 33% of the available transmission capacity from the ATM network unit concerned, when it is serviced at location $2_B$ it will be rescheduled at storage location $2_C$, three cell time slots ahead of the current time pointer T.

Incidentally, in this example, it can be seen that the A pointer, which at this time is pointing to the storage location $2_B$, is five storage locations behind the T pointer. Some catching up of the A pointer to the T pointer will be possible because of the empty storage locations between the two pointers but there are also three virtual channels VCy, VCz and VCw to service between the A and T pointers. This means that in practice it will be more than three cell periods before VCx will be encountered again for further processing.

One problem with the calendar scheduling method shown in FIG. 1 is that it is necessary to be able to cope with channels having very different transmission rates. Each cell period in an ATM network having a maximum data rate of 155 Mbps is 2.726 $\mu$s. However, some types of VC can have very low cell rates. For example, ABR channels use resource management (RM) cells for control purposes and the cell rates for such RM cells may be only 10 cells per second. This would require the calendar 1 in FIG. 1 to have 35000 entries (i.e. 35000×2.726 $\mu$s=0.1 s). This is impractical, as the calendar 1 requires a storage location 2 for each time slot.

One solution to this problem, proposed previously, is to include a counter with each VC, which counter is set initially to a certain positive value and then decremented on each pass around the calendar as each VC entry is examined by the traffic manager. The VC is only serviced (i.e. a cell transmitted and the next cell transmission scheduled) when its counter reaches 0. In this way, it is possible to reduce the size of the calendar to (say) 1000 storage locations, using a six-bit counter per VC. VCs whose cell rates are greater than 370 cells per second (an inter-cell period of 2.7 milliseconds at 155 Mbps) are always "hit" in the calendar, i.e. the counter for each such VC is permanently 0.

Although the solution outlined above is partially effective in reducing the calendar size, it is wasteful of traffic manager resources in that, even though a particular VC is encountered on each pass through the calendar, this does not necessarily mean that it should be serviced on each encounter. Often, therefore, entries are read by the traffic manager which do not require any servicing on this particular pass of the calendar.

A further disadvantage is associated with the need for each entry in the calendar to have a backward pointer (to the previous entry in the linked list) as well as a forward pointer. Because each VC has its own counter, and a linked list is processed from beginning to end, only those VCs whose respective counters are zero are no longer required. The remaining VCs in the linked list, whose respective counters are non-zero, must be retained in the linked list for the next calendar pass. To enable a VC whose counter has become zero to be removed from the linked list whilst still retaining the other (non-zero-counter) VCs, it is necessary to use the backward pointer of the VC to be removed to identify the immediately-preceding VC in the linked list so that the forward pointer of that immediately-preceding VC can be made equal to the forward pointer of the VC to be deleted, thereby reconstructing the linked list around the deleted VC. The need to provide backward pointers per VC makes the linked list processing complicated and also increases significantly the amount of information that the traffic manager must store.

In view of the problems identified above, it is desirable to provide an improved traffic manager and improved traffic managing method capable of handling disparate-rate VCs efficiently without requiring excessive processing power and/or storage capacity.

SUMMARY OF THE INVENTION

According to a first aspect of the present invention, there is provided scheduling circuitry, for scheduling predetermined events, including: a master calendar holding entries corresponding respectively to events that are to occur within a preselected master-calendar scheduling range; a slave calendar holding entries corresponding respectively to events that are to occur beyond said scheduling range; and calendar control circuitry operable, when an event is to be scheduled, to make an entry corresponding thereto in the slave calendar if the interval between a current time and a desired scheduling time for the event exceeds said scheduling range, the calendar control circuitry being further operable to monitor the entries in the slave calendar and to cause an entry therein whose corresponding event becomes within said scheduling range to be transferred to the master calendar.

According to a second aspect of the present invention there is provided a scheduling method, for scheduling predetermined events, wherein: when an event is to be scheduled, an entry corresponding thereto is made in a master calendar if the interval between a current time and a desired scheduling time for the event is within a preselected master-calendar scheduling range, and if said interval exceeds said preselected scheduling range an entry corresponding to the event is made in a slave calendar separate from the master calendar; and the entries in the slave calendar are monitored and any entry therein whose corresponding event becomes within said master-calendar scheduling range is transferred to the master calendar.

DETAILED DESCRIPTION OF THE PREFERRED EMBODIMENTS

Figure 1:
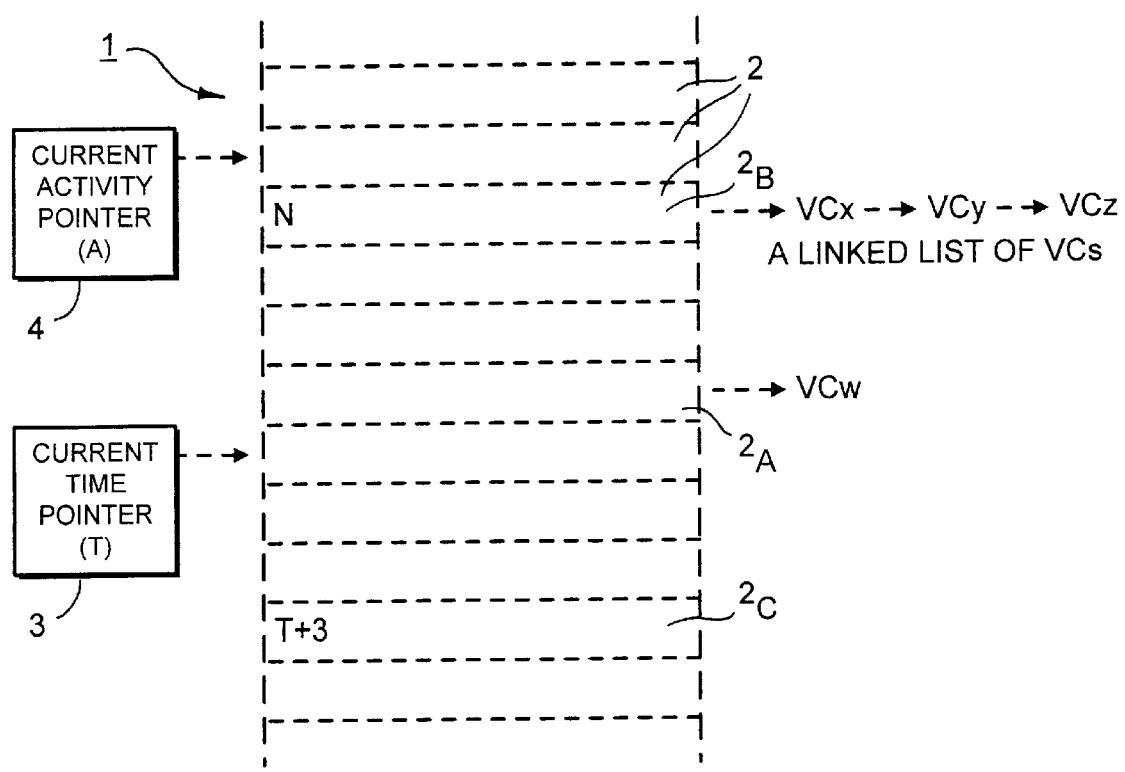
FIG. 1, discussed hereinbefore, shows a schematic diagram for use in explaining a previously-considered calendar scheduling method for use in an ATM network.
Figure 2:
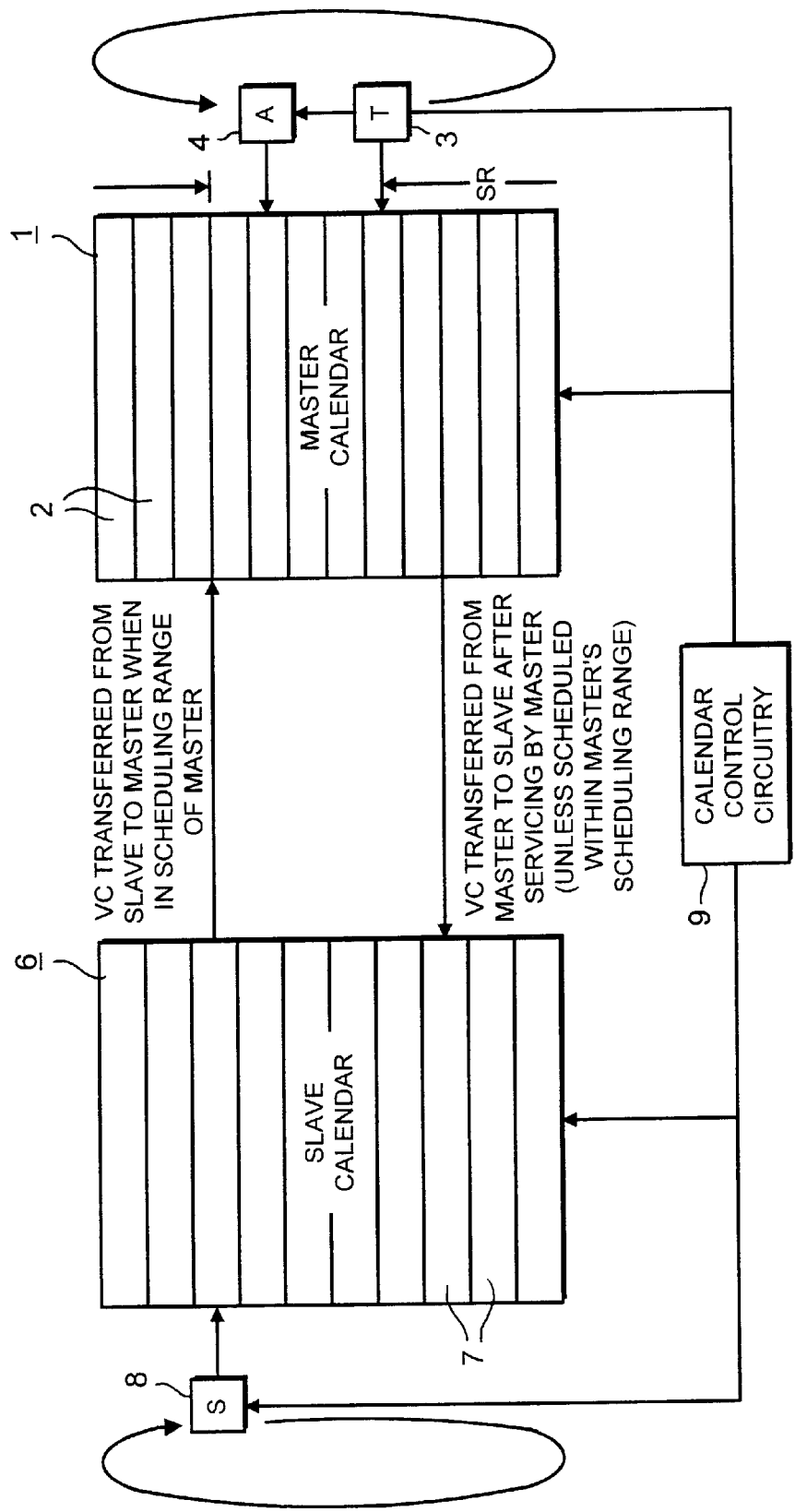
FIG. 2 shows a schematic block diagram for use in explaining principles underlying scheduling circuitry embodying the present invention.

FIG. 2 shows parts of scheduling circuitry embodying the present invention, for use in explaining the principles thereof. As with the previously-considered scheduling circuitry described with reference to FIG. 1, the scheduling circuitry of FIG. 2 has a master calendar 1 made up of a plurality of storage locations 2 corresponding respectively to a succession of time slots. Each storage location 2 is capable of storing one or more entries, each entry specifying a virtual channel (VC) that is to be serviced in the time slot to which its storage location corresponds. As in the FIG. 1 circuitry, the master calendar 1 has a current time pointer (T) 3 which is incremented in every cell period, and a current activity pointer (A) 4 which specifies the storage location 2 which is currently being serviced (or, alternatively, the next storage location to be serviced). The A pointer is always trying to catch up with the T pointer. It has the opportunity to catch up when there are no entries at a particular storage location but tends to fall behind the T pointer when more than one VC is entered in a storage location 2.

The scheduling circuitry shown in FIG. 2 differs from the FIG. 1 scheduling circuitry in that it is provided with a further calendar, called a "slave" calendar 6. This slave calendar 6 has a plurality of storage locations 7 and a slave pointer (S) 8 which points to one of the storage locations 7 of the slave calendar 6 that is currently being serviced.

The master and slave calendars and the associated A, T and S pointers are controlled by calendar control circuitry 9.

The FIG. 2 scheduling circuitry operates as follows. The storage locations 2 of the master calendar 1 are serviced sequentially by the calendar control circuitry 9 using the A pointer 4 to identify the currently-serviced storage location. As before, when each entry at the storage location pointed to by the A pointer is serviced, firstly a cell for the VC specified in the entry is transmitted. Secondly, using known techniques, the time (hereinafter "the next scheduled time" or NST) at which the next cell for the specified VC is to be transmitted is calculated. A rescheduling operation, different from that in the FIG. 1 circuitry, is then performed. In this different rescheduling operation, the calendar control circuitry examines the NST for the specified VC and determines whether or not it is within a scheduling range SR of the master calendar. As explained in more detail later on in the present specification, this scheduling range SR is proportional to the number of storage locations 2 in the master calendar less a preset number of storage locations, and represents the time it takes the T pointer to traverse that number of storage locations.

If the NST is within the scheduling range SR of the master calendar 1, a new entry for the specified VC is made in an appropriate one of the storage locations of the master calendar, as in the FIG. 1 scheduling circuitry.

If, on the other hand, the NST is outside the scheduling range SR of the master calendar 1, the specified VC is not entered in the master calendar 1. Instead, it is entered in one of the storage locations 7 of the slave calendar 6, which storage location is also used to store the NST for the specified VC.

The calendar control circuitry 9 continuously cycles through the storage locations 7 of the slave calendar 6 using the slave pointer S to identify the storage location currently being processed. When a slave-calendar storage location 7 is found to contain an active (or "busy") entry corresponding to a particular VC, the stored NST for that VC is examined. The NST is compared with the current time pointer T for the master calendar. If the time interval between the NST and the current time (T pointer) is less than the scheduling range SR of the master calendar, the VC specified in the slave-calendar storage location 7 is transferred to the master calendar, i.e. a new entry corresponding to that VC is made in an appropriate one of the master-calendar storage locations 2.

If the time interval between the stored NST of an examined slave-calendar storage location 7 and the current time is greater than the scheduling range SR of the master calendar, the slave-calendar storage location is left unchanged pending the next complete pass through the slave-calendar storage locations of the slave pointer S. Incidentally, in order to ensure that no necessary transfer of a VC from the slave calendar to the master calendar is missed, it is necessary that the time taken for the slave pointer S to complete one pass of the slave calendar 6 is less than or equal to the scheduling range SR of the master calendar.

In the FIG. 2 scheduling circuitry, the size of the master calendar can be much smaller than that of the calendar 1 of the FIG. 1 scheduling circuitry. For example, the size of the master calendar 1 can be simply made equal to the total number of VCs that have been set up (not all of these set-up channels will be active at any given time). If, say, there are only thirty such set-up channels, the size of the master calendar is reduced remarkably compared to the calendar 1 of the FIG. 1 circuitry which, even with counters per VC, typically has 1000 storage locations. In practice, different applications require different numbers of VCs to be set up. For example, there could be 1000, 4000 or 64000 VCs in some applications. As for the slave calendar 6, this also should have as many storage locations 7 as there are set-up VCs at any one time. There may of course be certain VCs which have sufficiently high transmission rates that they are never transferred to the slave calendar upon rescheduling. In this case, it may be possible to reduce the number of storage locations 7 in the slave calendar to less than the total number of active VCs.

It will be appreciated that the FIG. 2 scheduling circuitry is also effective in overcoming the disadvantages mentioned in the introduction that are associated with providing each VC with its own counter. Firstly, whenever a VC is entered in the master calendar, it necessarily follows that it is required to be serviced. Thus, there is a guaranteed "hit" for every entry in the master calendar. Secondly, if plural entries in the same storage location 2 of the master calendar 1 are made using linked lists, it is unnecessary to provide each entry with a backward pointer of the kind used in the FIG. 1 counter-based approach. This is because each linked list is used only once, when its particular master-calendar storage location 2 is serviced. After servicing, each entry belonging to that linked list is rescheduled (provided that more data is available to send), either at a different storage location of the master calendar or at an appropriate storage location of the slave calendar 6. No reconstruction of a linked list around a deleted entry is required. This greatly simplifies, and hence also speeds up, linked list handling.

Next, a first preferred embodiment of the present invention will be described with reference to FIGS. 3 to 9.

Figure 3:
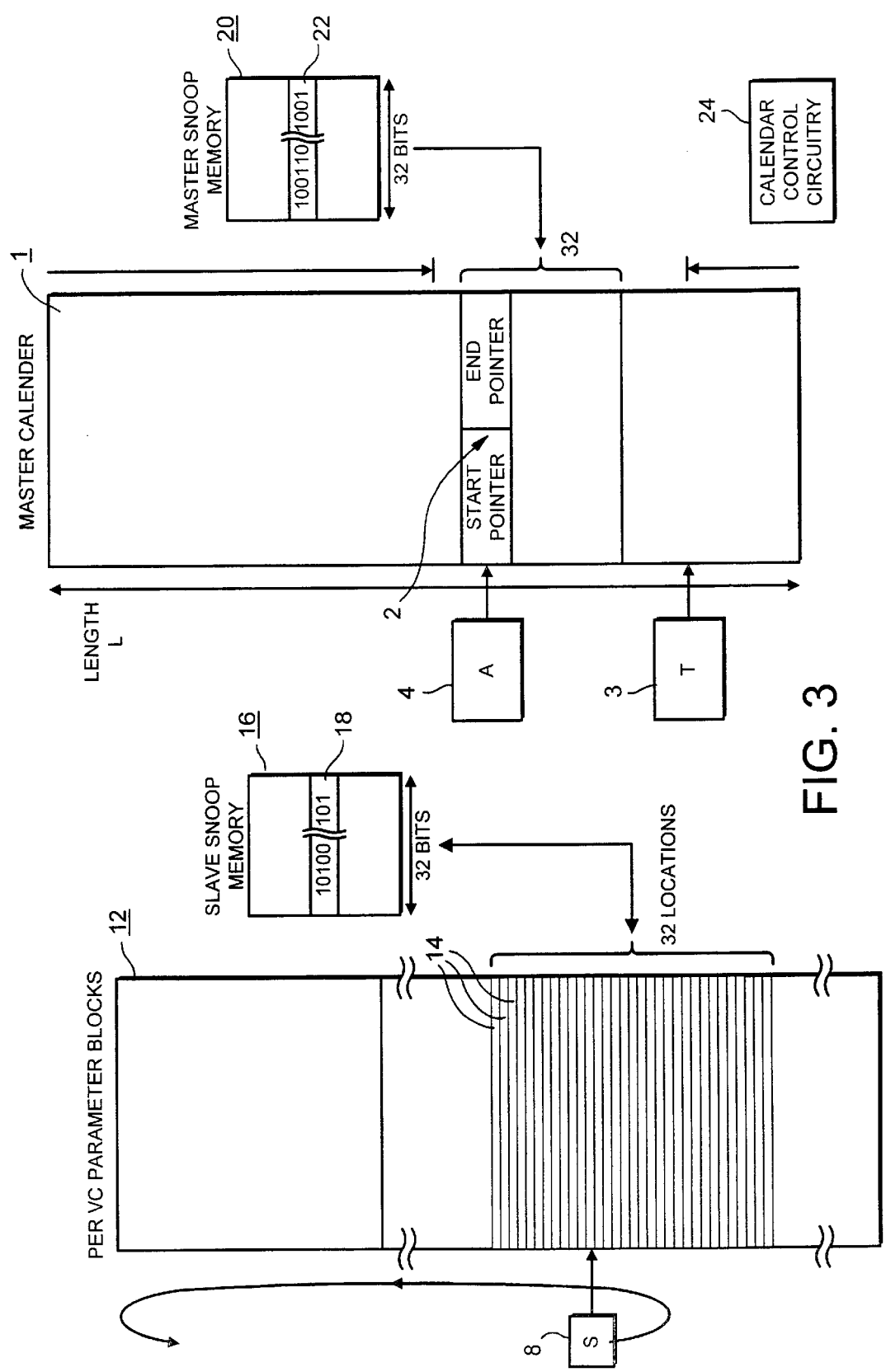
FIG. 3 shows parts of scheduling circuitry according to a first embodiment of the first invention.

Referring firstly to FIG. 3, the scheduling circuitry in the first embodiment comprises a master calendar 1, respective T, A and S pointers 3, 4 and 8, and calendar control circuitry 24.

The T pointer 3 is a 22-bit digital value because it needs to measure up to 10.23 seconds (corresponding to an allowed cell rate (ACR) decrease time factor (ADTF) time-out value for ABR channels) with a granularity of 2.726 $\mu$s (corresponding to one cell period at a transmission rate of 155 Mbps).

Incidentally, in one possible implementation a different cell period of 2.831 $\mu$s may be used. This cell period is arrived at as follows. The maximum required data rate is first calculated by expressing the bit rate of 155.52 Mbps in cells per second (each cell has 53 bytes of 8 bits each)—this corresponds to 2.726 $\mu$s as indicated before—and then multiplying this cell rate by a factor representing the proportion of data in a STS3c frame (i.e. 260 data bytes out of a total of 270 bytes in total—each STS frame contains 260 data bytes and 10 overhead bytes). Thus, the cell period is expressed by the following formula:

$$(8 \times 53)/(155.52 \times 10^6) \times (270/260) = 2.831 \ \mu s.$$

The A pointer 4 is a 16-bit parameter. The range of the A pointer therefore corresponds to $2^{16} \times 2.726 \ \mu s = 0.1787$ s. This is sufficient to deal with the lowest cell rates (RM cell rates) of approximately 10 cells per second. The size of the A pointer determines the dynamic range of the master calendar (10 bits would be sufficient for 1024 ($=2^{10}$) VCs but 16 bits permits the NSTs (timestamps) to have a range of $2^{16}$ cell periods).

In this embodiment, a single set 12 of storage locations 14 is used to make entries in the master calendar and in the slave calendar. These storage locations 14 correspond respectively to the different VCs of the ATM network unit concerned. For this reason, the storage locations 14 are referred to hereinafter as per-VC parameter blocks.

Figure 4:
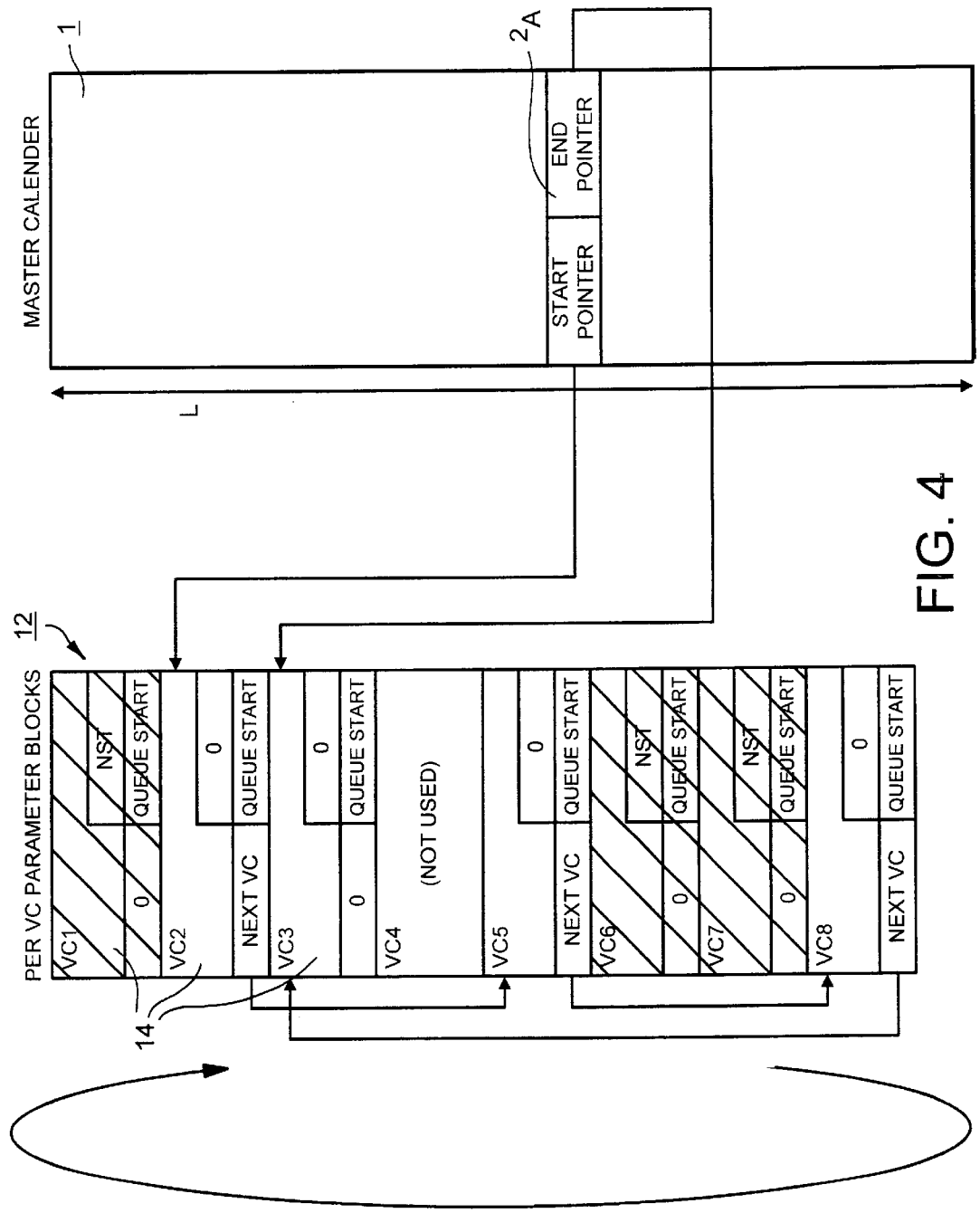
FIG. 4 shows, in more detail than FIG. 3, parts of the first embodiment.

Referring now to FIG. 4, these per-VC parameter blocks 14 are shown in more detail. These per-VC blocks are divided into three different types. Firstly, there are blocks which make up entries in the master calendar 1. As described previously with reference to FIG. 1, a storage location 2 in the master calendar 1 may have one or more entries therein, depending on the number of VCs to be serviced in the time slot to which that storage location corresponds. Thus, each master-calendar storage location 2 comprises respective start and end pointers, the start pointer pointing to the per-VC parameter block 14 constituting the first entry for the storage location 2 concerned and the end pointer pointing to the last per-VC parameter block entered in the storage location 2 concerned. If there is only one VC entered at the storage location 2 the start and end pointers will be the same and both will point to the per-VC parameter block corresponding to that one VC.

When more than one VC is entered at a particular master-calendar storage location 2, the per-VC parameter blocks are used to construct a linked list of all the entries. To this end, each per-VC parameter block has a "NEXT VC" field that contains a pointer to the location in the memory of the per-VC parameter block of the next VC entered in the master-calendar storage location 2. The NEXT VC field of the last per-VC parameter block in the linked list is in a "don't care" state.

For example, as shown by way of example in FIG. 4 itself, the storage location $2_A$ has 4 VCs VC2, VC5, VC8 and VC3 entered therein in that order. The start pointer therefore points to VC2. The NEXT VC field of VC2 points to VC5. The NEXT VC field of VC5 points in turn to VC8. The NEXT VC field of VC8 points to VC3. The NEXT VC field of VC3 is set to "don't care" as it is the last VC entered at the storage location $2_A$. The end pointer of the master-calendar storage location $2_A$ also points to VC3.

The second type of per-VC parameter block 14 is a slave-calendar entry. These blocks are hatched in FIG. 4. In this example VC1, VC6 and VC7 are currently in use as slave-calendar entries. These parameter blocks use an NST field to store a next scheduled time NST for transmission of a cell by the VC concerned. The NST field stores the NST as a 16-bit parameter.

The third type of per VC parameter block is an unused block, of which FIG. 4 shows a single example at VC4.

As shown in FIG. 4, both the first and second types of per VC parameter block 14 also contain respective "QUEUE START" fields. During operation of the ATM network unit in which the scheduling circuitry is included, cell data for transmission by the scheduling circuitry is continuously being created by further circuitry of the network unit. The cell data is stored on a per-VC basis in queues. The QUEUE START field of each per VC parameter block 14 accordingly points to the head of its cell data queue. After a cell is sent, the QUEUE START field is updated to point to the new head of the queue.

Incidentally, the per-VC parameter blocks used to provide slave-calendar entries have their respective NEXT VC fields in a "don't-care" state, as these VCs in the slave calendar are not linked together in a linked list.

Returning now to FIG. 3 again, the scheduling circuitry in the first embodiment further comprises respective slave and master snoop memories 16 and 20.

Dealing firstly with the slave snoop memory 16, the set 12 of per-VC parameter blocks 14 is divided into groups of N blocks (in this example N=32). The slave snoop memory 16 has a width of N bits. Each N-bit word 18 of the slave snoop memory 16 therefore corresponds to a group of N consecutive per-VC parameter blocks 14 of the set 12, and each bit of the N-bit word 18 corresponds individually to one of the parameter blocks 14 of the group corresponding to the word 18. When a bit is set to 1, this denotes that the corresponding per-VC parameter block 14 is being used as a slave-calendar entry. When the bit is reset, on the other hand, this denotes that the corresponding parameter block 14 is entered in the master calendar or is not in use at all.

The slave snoop memory 16 enables the calendar control circuitry 24 to identify those parameter blocks 14 which constitute slave-calendar entries without having to read each parameter block directly. This is important bearing in mind that the slave pointer S must complete a pass of the set 12 of per-VC parameter blocks 14 in a time no greater than the scheduling range SR of the master calendar 1.

The master snoop memory 20 serves a similar purpose in relation to the master calendar 1. Again, the master calendar is divided into groups of N consecutive storage locations 2 (again N=32 in this embodiment). The master snoop memory 20 is N bits wide such that each N-bit word 22 thereof corresponds to one of the groups of N consecutive storage locations 2. Each bit within such an N-bit word 22 corresponds individually to one of the storage locations 2 of the group. In this case, when a bit in the word 22 is set to 1, this denotes that the corresponding storage location 2 has at least one VC entered therein. If the bit is 0, on the other hand, this denotes that the corresponding storage location 2 is "empty", i.e. does not contain a valid entry.

The master snoop memory 20 is used by the calendar control circuitry 24 to avoid examining those storage locations 2 that do not contain any VC entries. This is helpful in enabling the A pointer 4 to catch up with the T pointer 3.

A concrete example of the use of the master calendar snoop 20 will now be given with reference to FIGS. 5 and 6.

Figure 5:
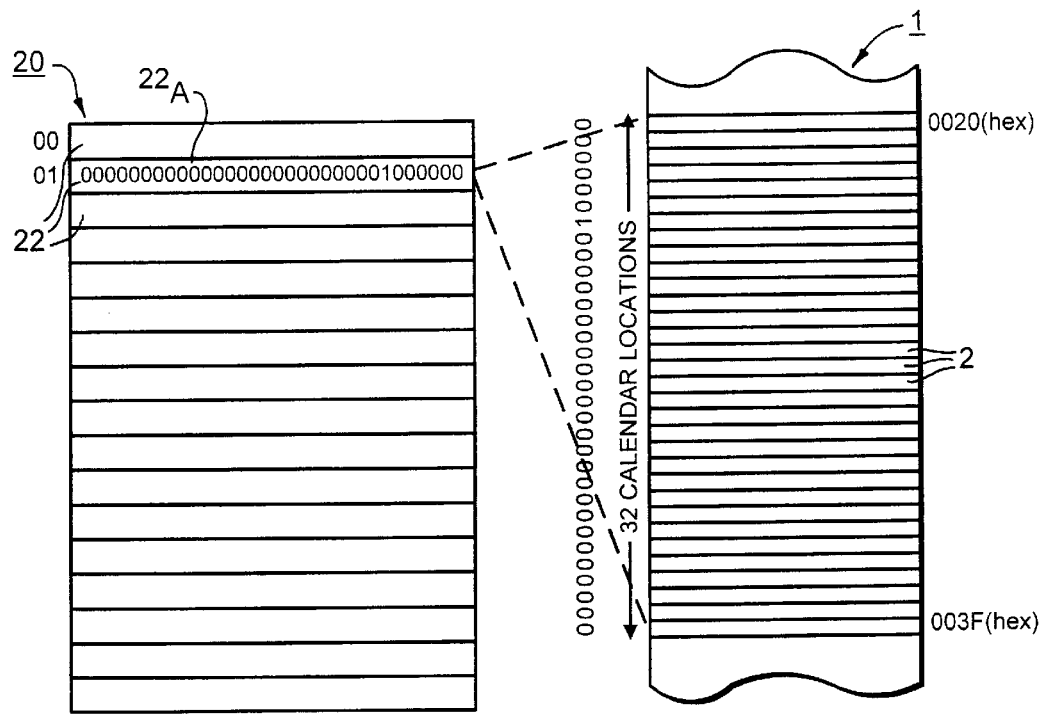
FIG. 5 shows a schematic block diagram for use in explaining operation of a master snoop memory in the first embodiment.
Figure 6:
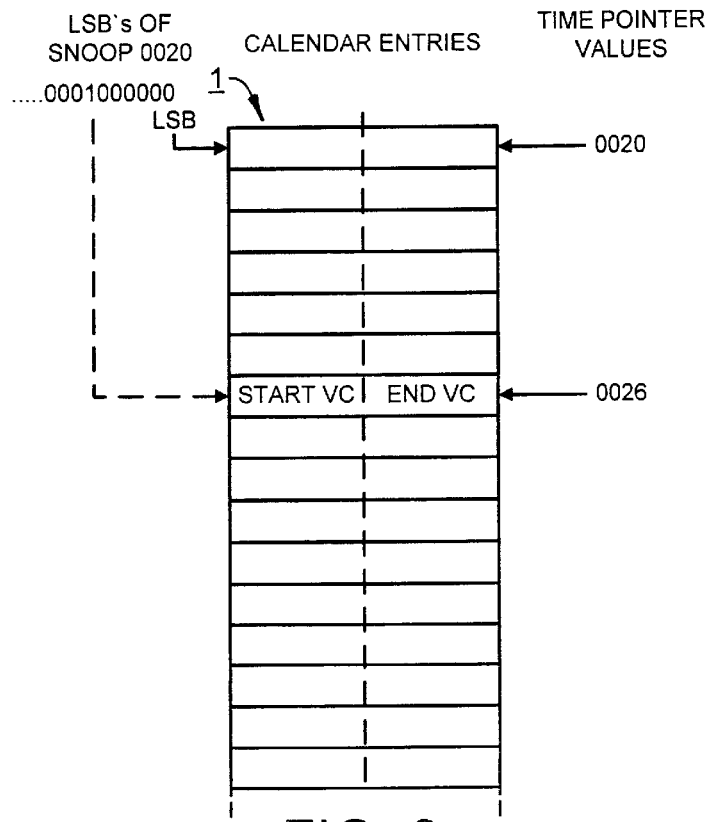
FIG. 6 shows a further schematic diagram for explaining use of the master snoop memory.

In FIG. 5, a group of 32 master-calendar storage locations 2 corresponding to one particular word $22_A$ of the master snoop memory 20 is shown. This group of storage locations has the physical storage location 0020(hex) to 003F(hex). In the word $22_A$ the first non-zero bit is six places to the left of the least significant bit (LSB), signifying that the first calendar entry in the group concerned is at location 0020+6=0026(hex).

Accordingly, the calendar control circuitry 24 knows from reading the word $22_A$ that it is unnecessary to service the storage locations from 0020 to 0025(hex). The first storage location to be processed is at 0026(hex), as shown in FIG. 6.

Incidentally, it may be that the storage location (0026 in this example) is ahead of the current time pointer T. In this case, calendar control circuitry 24 waits until the T pointer reaches the storage location 0026 before servicing the entries at that location. Such waiting may be required since otherwise it would be possible for a storage location ahead of the T pointer to be serviced which is not allowed.

As mentioned previously, it is possible for the activity pointer A to lag behind the current time pointer T because there may be more than VC scheduled in any particular time slot. Since the master calendar 1 is processed in a continuous loop (i.e. the A and T pointers "wrap around" or return to the first storage location 2 in the master calendar after reaching the last storage location therein), there needs to be a protection mechanism to ensure that channels that are being scheduled near to the limit of the master calendar are not written into a portion of a master calendar that the activity pointer A has not yet been serviced and hence could corrupt the data flow for that channel.

To provide such a protection mechanism the scheduling range SR of the master calendar is made less than the total number L of storage locations 2 in the master calendar by a preset number of storage locations, for example 256 storage locations if the number of storage locations in the master calendar is, say, around 1000.

Figure 7:
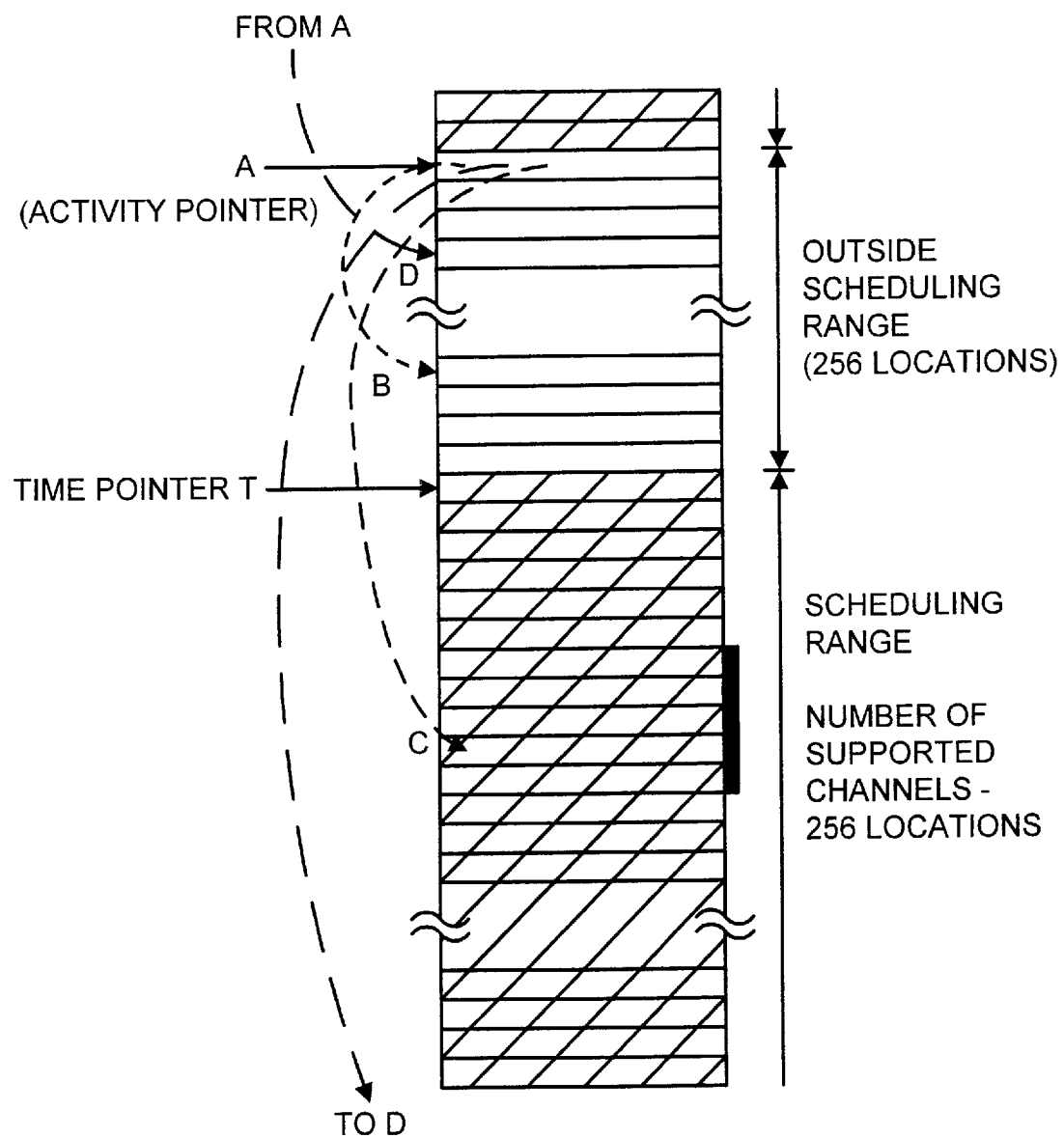
FIG. 7 shows a schematic block diagram for use in explaining a rescheduling operation in the first embodiment.

Referring now to FIG. 7, the activity pointer A is shown lagging behind the time pointer T by a certain number (less than 256) of storage locations of the master calendar.

As mentioned previously, when each entry at the storage location pointed to by the A pointer is serviced, it is determined that the VC concerned should be rescheduled in the slave calendar if the next scheduled time (NST) is farther in the future (i.e. ahead of the current time as measured by the T pointer) than the scheduling range (shown hatched in FIG. 7) of the master calendar 1. In other words, it is checked whether the difference between the NST and the current time pointer T is greater than the scheduling range of the calendar. This difference can be calculated easily, even if the T pointer has "wrapped around" the master calendar because it can be assumed that the NST is always in the future with respect to T.

The different rescheduling possibilities are explained as follows.

If the calculated NST is before the current time (as is possible for CBR channels), so that a storage location B ahead of the T pointer in FIG. 7 corresponds to the NST, the calendar control circuitry 24 rounds up the NST so that the VC is scheduled at the next storage location (T+1) after the storage location pointed to by the current time pointer T.

Incidentally, CBR traffic is scheduled relative to the A pointer but must be placed after the T pointer (at T+1) if the NST would be before (less than) the T pointer. All other traffic is scheduled relative to the T pointer. The A pointer can run ahead of the T pointer because the master snoop memory can permit locations ahead of the A pointer to be read. However, in this case no servicing of such locations would be performed until the T pointer has caught them up.

If the NST is within the scheduling range SR, so that a storage location C in FIG. 7 corresponds to the NST, the calendar control circuitry 24 enters the VC in that storage location C within the scheduling range. If that storage location was previously empty, the start and the end pointers at that storage location are updated to point to the per-VC parameter block corresponding to the VC being rescheduled. If, however, there was already one or more entries at the storage location concerned, the calendar control circuitry 24 appends the per-VC parameter block 14 corresponding to the VC to be rescheduled to the end of the existing linked list at the storage location C. This entails updating the NEXT VC field of the last per-VC parameter block 14 in the existing linked list to point to the location in memory of the per-VC parameter block 14 being appended to the list and then updating the end pointer in the master-calendar storage location 2 to point to the appended per VC-parameter block 14.

If the NST signifies that the VC should be rescheduled beyond the scheduling range (e.g. at storage location D in FIG. 7) the calendar control circuitry does not allow the entry to be made in the master calendar and enters the VC in the slave calendar instead. This is accomplished simply by setting to 1 the bit in the slave snoop memory 16 corresponding to the VC to be rescheduled, and updating the NST field of the per-VC parameter block 14 corresponding to the VC to reflect the calculated NST.

Figure 8:
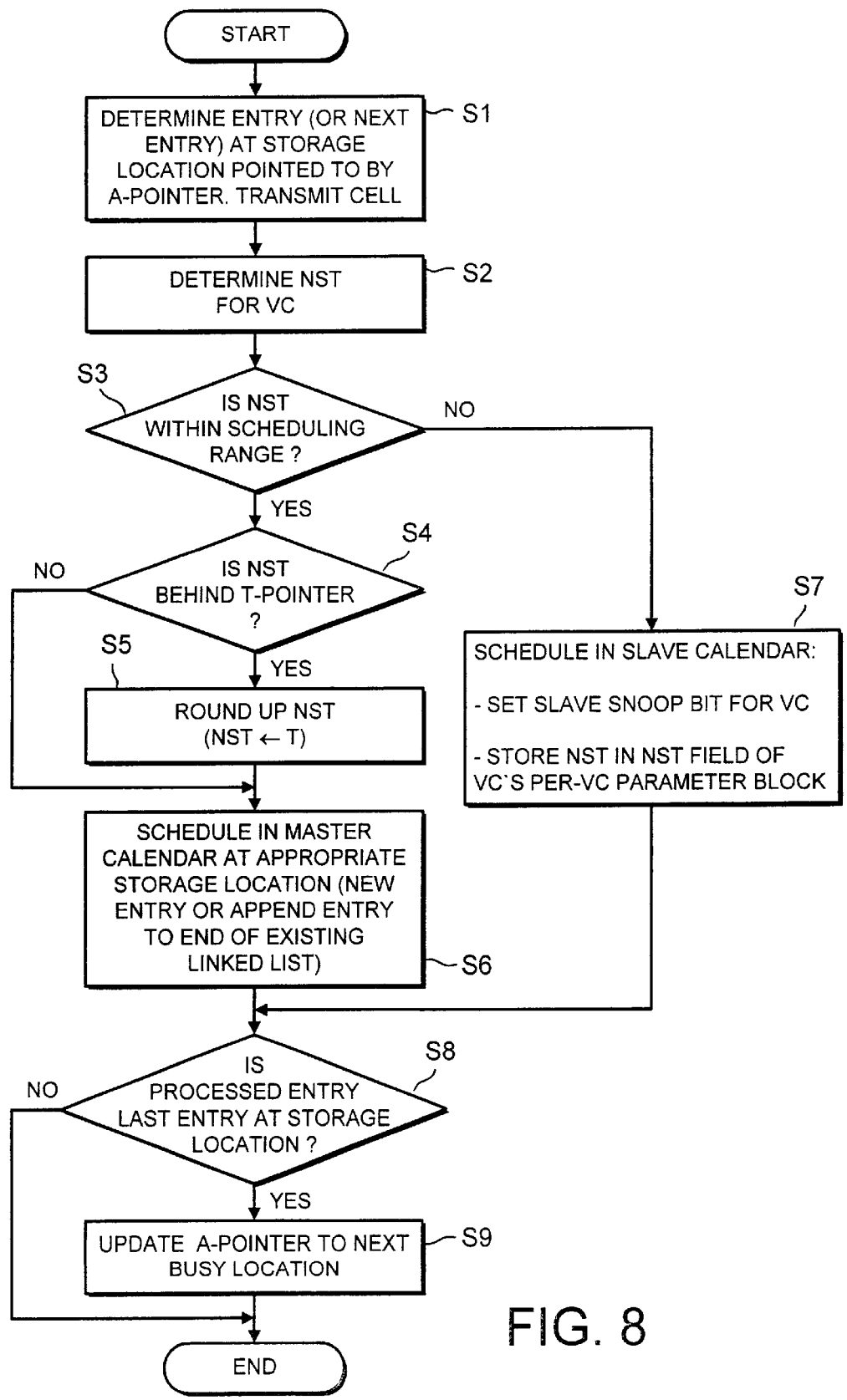
FIG. 8 shows a flowchart illustrating processing of entries in a master calendar of the first embodiment.

The steps carried out by the calendar control circuitry 24 to service master-calendar entries will now be explained with reference to FIG. 8.

Firstly, in step S1, the calendar control circuitry 24 determines the next entry to be processed at the storage location pointed to by the A pointer. This entry (even if it is the second or subsequent entry to be processed at the storage location concerned) is identified using the start pointer in the storage location which points to the location in memory of the per-VC parameter block 14 for the VC concerned. Once the per-VC parameter block 14 of the VC to be processed has been identified, the QUEUE START field for that parameter block is examined to locate the cell to be transmitted. This cell is then transmitted and the QUEUE START field updated ready for the next servicing of that VC.

The start pointer for the storage location is then also updated to point to the following entry (if any) in the storage location, i.e. the start pointer is set to the location held in the NEXT VC field of the entry now being processed. If there is no following entry, i.e. the start pointer now has the same value as the end pointer, the master snoop memory 20 is updated to remove that storage location from the master calendar.

In step S2, conventional processing is applied to determine the NST for the VC being processed. Incidentally, when calculating the NST the calculation preferably is carried out at a higher precision than one full-rate cell period, i.e. at a fraction of the cell period. This fraction is maintained (e.g. in the per-VC parameter block for the VC concerned using a fraction field additional to the NST field) and is used each time the NST is calculated. This enables a VC to achieve an average transmission rate whose intercell interval is not equal to an integer number of full-rate cell periods, even though the scheduling slots in the master calendar each correspond to one full-rate cell period.

In step S3, it is determined whether or not the calculated NST is outside the scheduling range SR of the master calendar.

If the NST is within the scheduling range, processing proceeds to step S4 in which the NST is compared with the T pointer. If the NST is behind the T pointer ("yes" in step S4) processing proceeds to step S5 in which the calendar control circuitry rounds up the NST to make it equal to the value (T+1) of the T pointer plus 1. Otherwise, if the outcome is "no" in step S4, processing proceeds directly to step S6.

In step S6, the VC is rescheduled in the master calendar. The master-calendar storage location in which the VC is to be rescheduled is determined based on the NST. If that storage location is initially blank, the start and end pointers thereof are updated to point to the per-VC parameter block 14 for the VC being processed. Otherwise, as indicated previously, the per-VC parameter block is appended to an existing linked list at the storage location concerned.

If the result in step S3 is "no", i.e. the calculated NST is outside the scheduling range SR of the master calendar, processing proceeds to step S7. In step S7 the VC being processed is rescheduled in the slave calendar. Firstly, the calculated NST is stored in the NST field of the per-VC parameter block 14 corresponding to the VC. Secondly, the bit in the slave snoop memory 16 that corresponds to the VC is set to 1. Processing then proceeds to step S8.

Finally, in step S8 it is determined whether or not the VC just processed was the last VC to be processed at that storage location (master snoop memory 20 updated in step S1 to remove that storage location from the master calendar). If so, the A pointer is updated, using the master snoop memory 20 to determine the next busy location, ready for the next servicing operation. Processing then terminates.

Processing of the slave calendar will now be explained with reference to FIG. 9.

Processing of the slave calendar is carried out in parallel with processing of the master calendar.

In a first step S10 the calendar control circuitry 24 determines, using the slave snoop memory 16, the first busy storage location ahead of the S pointer 8 in the slave calendar. Then, in step S11 the NST field of the per-VC parameter block at that busy location is read. In step S12 the stored NST in the NST field is compared with the current time pointer T. If the difference between the stored NST and T is within the scheduling range SR of the master calendar, processing proceeds to S13.

Figure 9:
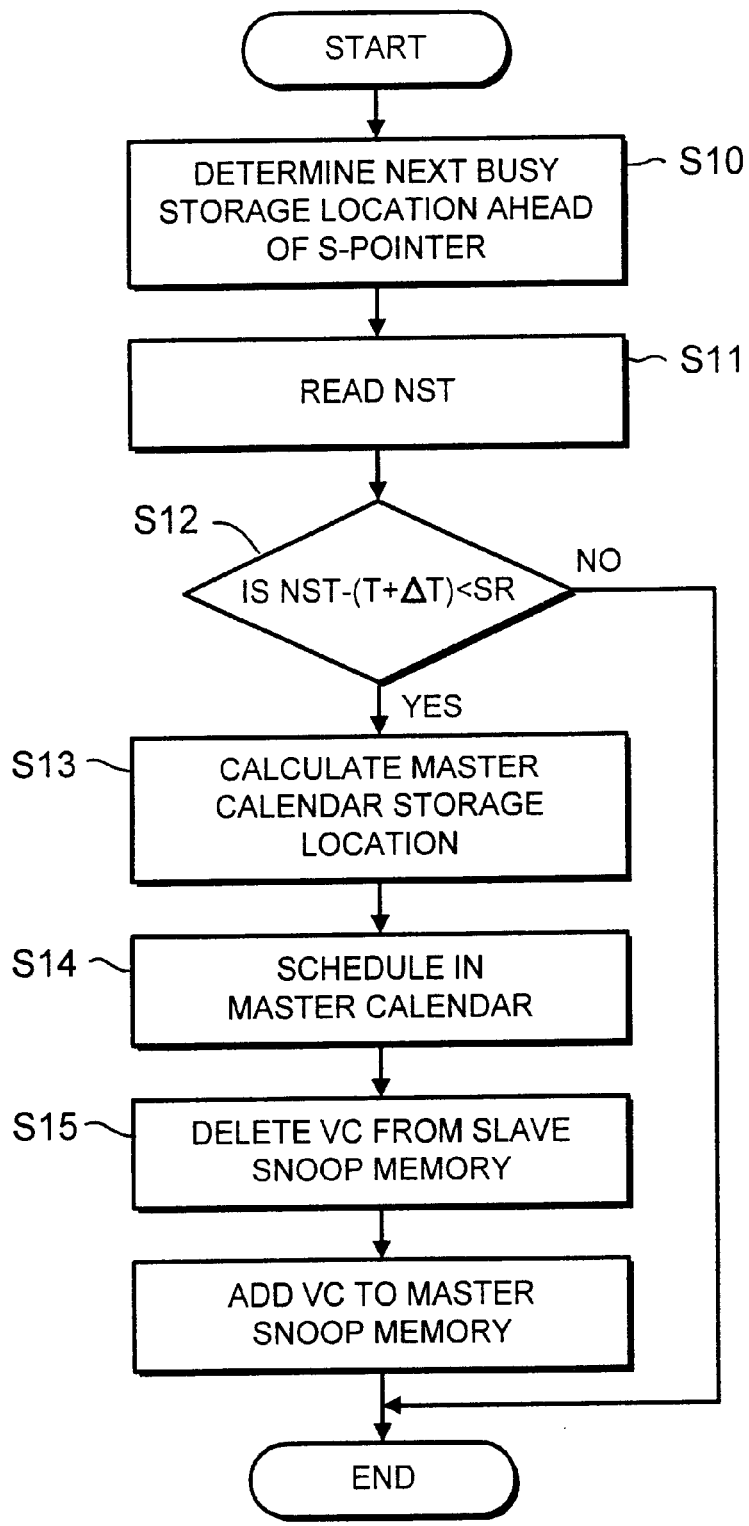
FIG. 9 is a flowchart illustrating processing of entries in a slave calendar of the first embodiment.

Incidentally, as indicated in FIG. 9, the stored NST may in fact be compared with the T pointer plus a predetermined offset time $\Delta T$. If the difference between the stored NST and $(T+\Delta T)$ is within the scheduling range SR of the master calendar, processing proceeds to S13. The offset time $\Delta T$ may be used in the comparison because it may be necessary to allow some time for the memory writing operations associated with the transfer of a VC to the master calendar. The offset time may be set to zero.

In step S13, the calendar control circuitry 24 determines from the NST the position (storage location 2) at which the VC should be entered in the master calendar. Then, in step S14, the VC is entered in that storage location. This step S14 is essentially the same as the step S6 described previously in relation to FIG. 8.

Then, in step S15 the bit in the slave snoop memory 16 that corresponds to the VC is reset, and the bit in the master snoop memory 20 that corresponds to the VC is set, to reflect the transfer of the VC from the slave calendar to the master calendar. Processing then ends.

In the step S12, if it is found that the difference between the stored NST and T (or $T+\Delta T$) is greater than the scheduling range SR of the master calendar then no action is taken and processing is terminated.

Figure 10:
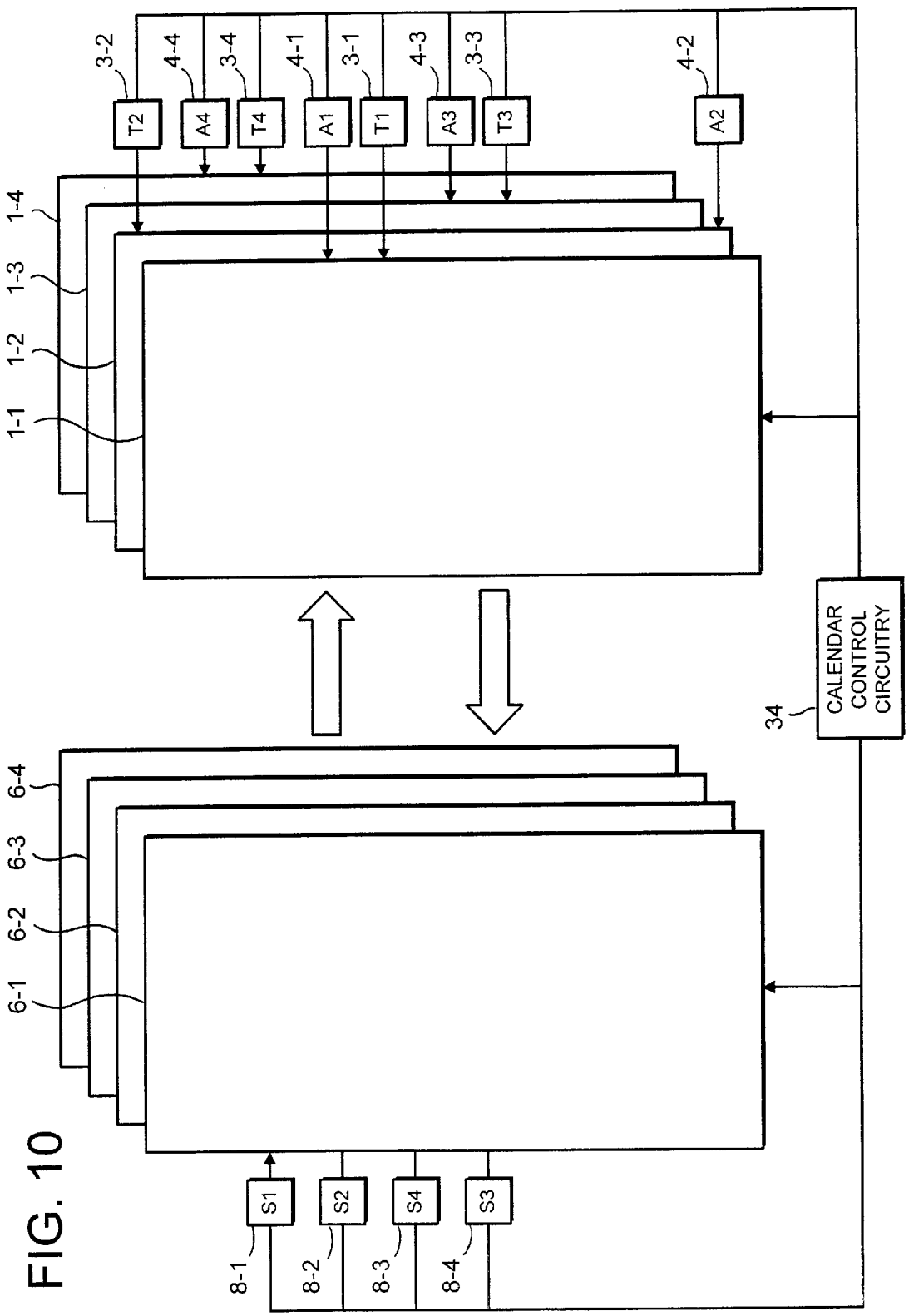
FIG. 10 shows parts of scheduling circuitry according to a second embodiment of the present invention capable of dealing with different types of cell traffic.

FIG. 10 shows parts of scheduling circuitry according to a second embodiment of the present invention. This embodiment is intended to enable cells of different priorities to be handled effectively.

The FIG. 10 circuitry comprises four master calendars 1-1 to 1-4 and also effectively has four slave calendars 6-1 to 6-4. Each master calendar 1-1 to 1-4 has the same structure as the master calendar 1 in the first embodiment. The slave calendars 6-1 to 6-4 in the second embodiment also have the same basic structure as the slave calendar 6 in the first embodiment.

Each master calendar has its own T pointer 3 and its own A pointer 4. For example, the master calendar 1-1 has a T pointer 3-1 (T1) and a A pointer 4-1 (A1). Each slave calendar 6 has its own S pointer 8. For example, the slave calendar 6-1 has its own S pointer 8-1 (S1). Calendar control circuitry 34 is connected to all the master and slave calendars 1 and 6 and to all of the pointers 3, 4 and 8 for controlling operation of the scheduling circuitry.

In the FIG. 10 circuitry, each master calendar 1-1 to 1-4 corresponds to a different priority level of cell traffic within the ATM network unit. For example, the master calendar 1-1 may have the highest priority, the master calendar 1-2 the next highest priority, and so on. As indicated in the introductory portion of the present specification, different virtual channels of an ATM network carry different types of cell traffic having different priorities. High-priority virtual channels include constant bit rate (CBR) channels. In the FIG. 10 circuitry, accordingly, such channels would be scheduled in the highest-priority master calendar 1-1. Variable bit rate (VBR) channels also have a high priority (but less than CBR channels) and these would be scheduled in master calendar 1-2. Available bit rate (ABR) channels have low priority and these would be scheduled in master calendar 1-3. Finally, unspecified bit rate (UBR) channels can be scheduled in the lowest-priority master calendar 1-4.

Each master calendar 1 has its own individually-corresponding slave calendar 6. For example, the slave calendar 6-1 corresponds to the master calendar 1-1 in FIG. 10. Each master calendar 1 and its individually-corresponding slave channel operate in basically the same way as in the first embodiment described above. In particular, the master calendar has storage locations (not shown in FIG. 10) which serve to store entries corresponding to respective VCs. These storage locations are serviced sequentially by the calendar control circuitry 34 as the A pointer for the master calendar concerned advances. The T pointer for the master calendar concerned is advanced in every cell period, such that the A pointer typically lags behind (but is always trying to catch up with) the T pointer.

When an entry in the storage location pointed to by the A pointer is serviced, a cell of the VC specified in the entry is transmitted and the VC is rescheduled. In such rescheduling, if the next scheduled time NST for the VC is within the scheduling range SR of the master calendar, the VC is rescheduled in an appropriate subsequent entry of the master calendar. If, on the other hand, the NST is beyond the scheduling range SR of the master calendar, the VC is entered in the slave calendar 6 that corresponds to the master calendar concerned. The NST is also included in the entry in the slave calendar, as described previously in relation to the first embodiment.

Each slave calendar 6 is scanned continuously by its associated S pointer 8. The total time taken for a complete pass by the S pointer through its associated slave calendar 6 is made less than the scheduling range SR of the master calendar to which it corresponds. When a VC is found in the slave calendar at the storage location pointed to by the S pointer the stored NST for that VC is compared with the current time pointer T of the master calendar to which the slave calendar concerned corresponds, as described previously. The VC is transferred from the slave calendar to the master calendar if the VC is found to be now within the scheduling range of the master calendar. If, on the other hand, the VC is still outside that scheduling range, the VC is left for the next pass through the slave calendar by the S pointer.

Although not shown in FIG. 10 for the sake of simplicity, the scheduling circuitry in the second embodiment may also optionally be provided with a master snoop memory for each master calendar 1 and/or a slave snoop memory for each slave calendar 6. In practice, because of the contending demands of the different channels in an ATM network unit in which cell priorities are recognized the use of such master and slave snoop memories in the second embodiment is to be preferred.

Operation of the second embodiment (including such master and snoop slave memories) will now be described with reference to FIG. 11.

Figure 11:
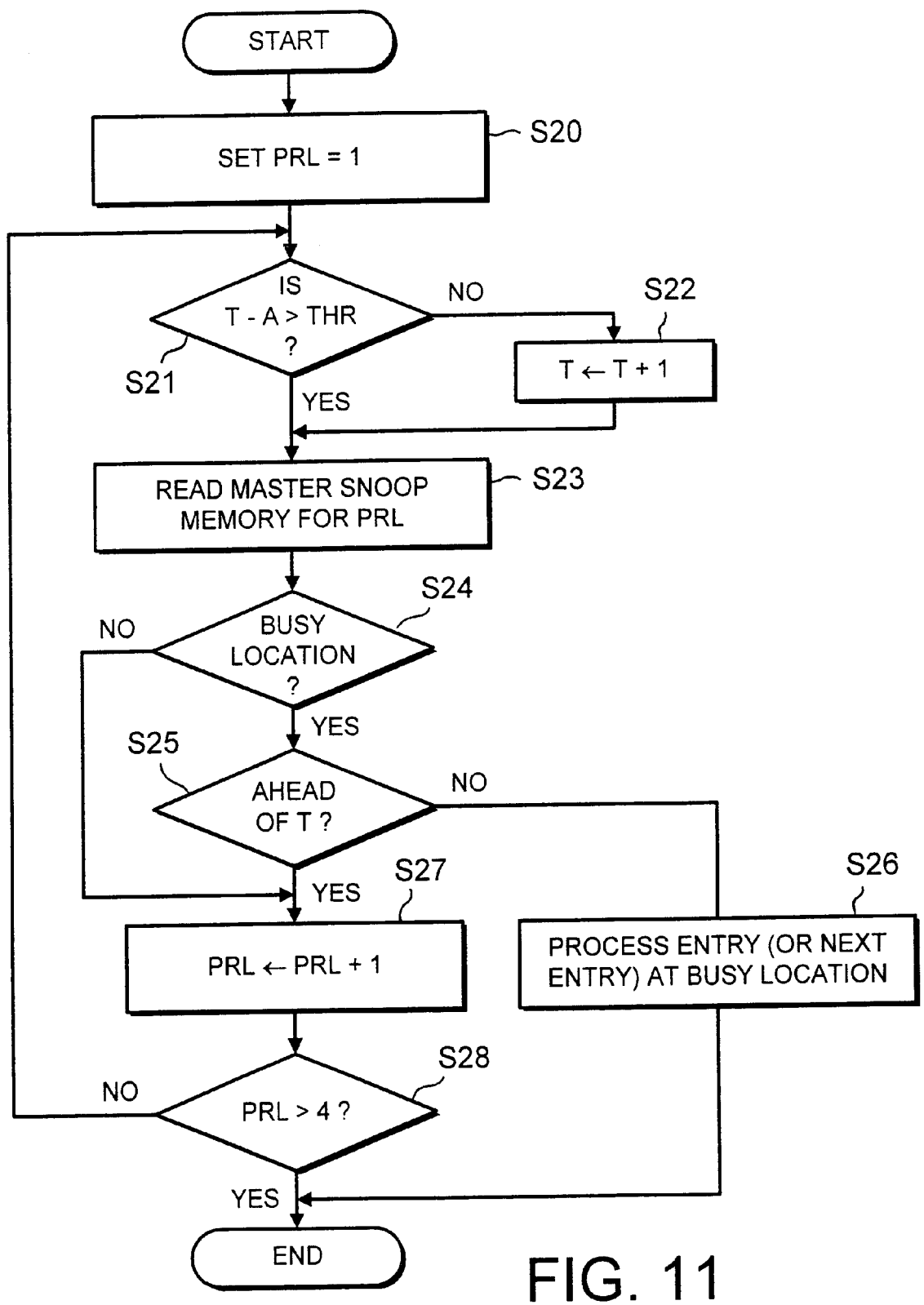
FIG. 11 shows a flowchart for use in illustrating operation of the second embodiment.

FIG. 11 shows the operations in relation to the master calendars 1-1 to 1-4. Each of the slave calendars 6-1 to 6-4 operates autonomously according to the flowchart described hereinbefore with reference to FIG. 9.

The sequence of steps shown in FIG. 11 is carried out in each cell period. At the start of the cell period, in step S20, a parameter PRL, representing the priority level of the master calendar being processed, is set to 1 (highest priority). Then, in step S21 a check is made as to whether the gap between the T and A pointers for the master calendar 1 having that priority level PRL is greater than some predetermined threshold value THR (e.g. 256). If not, the T pointer for the master calendar concerned is incremented by one in step S22. Otherwise, the T pointer is not incremented, so that the master calendar concerned is effectively halted so as to give the A pointer a chance to catch up with the T pointer.

Then in step S23 the calendar control circuitry 34 reads the master snoop memory for the priority level PRL (initially 1). In step S24 the results of the master-snoop-memory read in step S23 are analysed to determine whether there is any "busy" master-calendar storage location in the immediate range of the A pointer, i.e. a storage location that contains at least one entry. If so, the calendar control circuitry 34 determines in step S25 whether or not this busy location is ahead of the T pointer or not. If the busy location is not ahead of the T pointer, the calendar control circuitry 34 determines that the next entry which should be processed is the entry (or, if more than one entry, the next entry) in that busy location of the current priority-level master calendar.

This entry is then processed in step S26. The processing steps performed in step S26 correspond effectively to the steps S1 to S9 in FIG. 8.

If in step S24 no busy location is found, or in step S25 the next busy location is found to be ahead of the T pointer, the calendar control circuitry 34 determines that in this case it is not necessary to service the master calendar at the current priority level PRL (1 initially) and in step S27 increments the priority-level parameter PRL so as to move to the next-lowest priority level. In step S28 it is determined whether or not all of the possible priority levels have been serviced. If not, processing returns to step S21 to service the master calendar for the next priority level. If all four priority levels have been dealt with, processing ends after step S28.

Thus, as indicated in FIG. 11, if there is no busy location indicated by the master snoop memory for a particular priority level, the calendar control circuitry moves to the next-lowest priority level and reads the master snoop memory for that level. Similarly, if the next busy location in the master calendar at one priority level is ahead of the current time pointer T for that level, the calendar control circuitry 34 moves to the next-lowest priority level to look for eligible locations to send from lower-priority master calendars.

In the second embodiment it would also be possible for the four slave calendars 6-1 to 6-4 to be provided by a single slave memory, i.e. there could be four logical slave calendars within a common area of memory. In this case, each entry in the single slave memory would be assigned to one of the four logical slave calendars 6-1 to 6-4 in some suitable way, for example by providing each entry with a 2-bit priority-level field enabling one of four priority levels to be identified. In this case it would be possible for each slave calendar to have its slave pointer (as described above) or a single slave pointer could be used to service all four logical slave calendars in priority order.

It would also be possible for the processing shown in the FIG. 11 flowchart to represent just one clock cycle, with the step S21 being carried out in parallel for all priority levels in every clock cycle.

Figure 12:
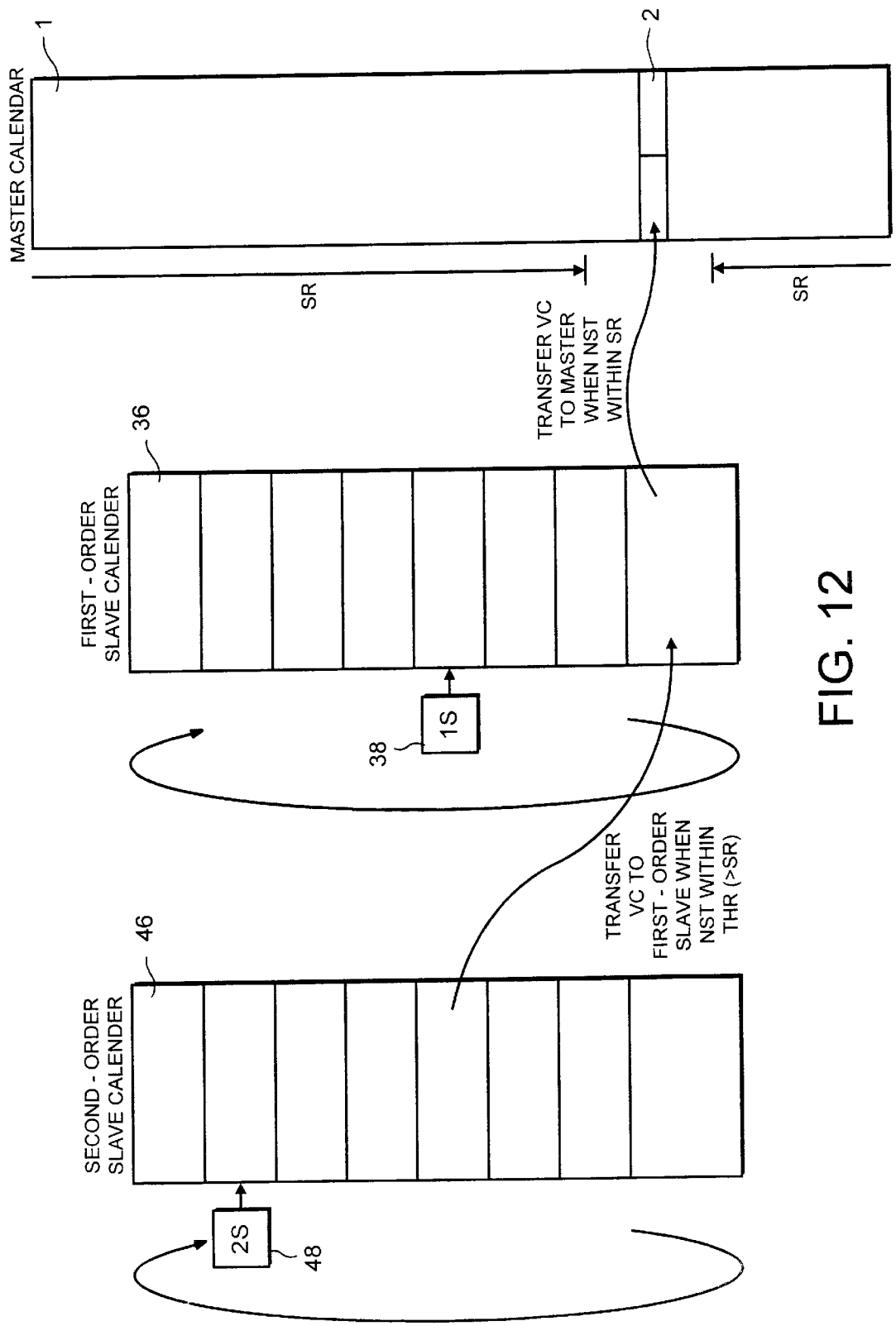
FIG. 12 shows parts of scheduling circuitry according to a third embodiment of the present invention.

FIG. 12 shows parts of a third embodiment of scheduling circuitry according to the present invention. In this embodiment, there is a master calendar 1 (as in the first embodiment) but in place of the single slave calendar 6 in the first embodiment there are respective first-order and second-order slave calendars 36 and 46. The first-order slave calendar 36 has an S pointer 38 (1S), and the second-order slave calendar 46 has an S-pointer 48 (2S). The master calendar 1 has the usual T and A pointers (not shown in FIG. 12).

The third embodiment is provided in view of the following consideration. In the first embodiment it is necessary for each entry in the slave calendar to be serviced at intervals less than or equal to the scheduling range of the master calendar. However, the more locations there are to read in the slave calendar the more difficult it is for the calendar control circuitry to deal with all the slave-calendar entries in a time less than or equal to the scheduling range. To alleviate this problem, in the third embodiment a "hierarchy" of slave calendars is provided. The two slave calendars 36 and 46 in the hierarchy can in this case represent different orders of magnitude of time. For example, if the scheduling range SR of the master calendar is 1 millisecond, the first-order slave calendar 36 could be used to deal with VCs having cells that need to be sent in the next 10 milliseconds and the second-order slave calendar could be used to deal with VCs having cells that need to be sent in the next 100 milliseconds. Thus, when a VC entered in the master calendar 1 is processed and then rescheduled, if the calculated NST is greater than 10 milliseconds, that VC is rescheduled in the second-order slave calendar 46. If, however, its calculated NST is greater than the scheduling range SR (1 millisecond) of the master calendar but less than 10 milliseconds, it is rescheduled in the first-order slave calendar 36. As in the previous embodiments, if its NST is within the scheduling range, the VC is rescheduled in the master calendar directly.

As far as the processing of the slave-calendar entries is concerned, in the case of the second-order slave calendar 46, it is necessary for each of the entries therein to be serviced at least once in every 10 milliseconds so that the VC can be transferred to the first-order slave calendar when its NST is less than 10 milliseconds away. In the case of the first-order slave calendar 36, it is necessary for each entry to be serviced at least once in every one millisecond, so that the VC can be transferred from the first-order slave calendar to the master calendar when its NST is within the scheduling range of the master calendar.

Accordingly, it will be appreciated that for any VC for which the interval between cell transmissions is greater than 10 milliseconds, that VC will spend part of the time in the second-order slave calendar, thereby lightening the load on the first-order slave calendar. A VC having a cell transmission interval of 100 ms would spend approximately 90% of its time entered in the second-order slave calendar 46, approximately 9% of its time entered in the first-order slave calendar 46 and only 1% of its time entered in the master calendar.

Any number of orders of slave calendar can be provided, depending on the sizes of the calendars (amount of available memory) and the diversity in traffic rates.

The third embodiment of the present invention is particularly suitable for use in ATM network units in which there is a wide disparity in the range of traffic rates, i.e there are some VCs having very low rates and other VCs having very high rates. In such situations, the third embodiment is highly effective in reducing the search times through the slave calendars.

Entries in the first-order and second-order slave calendars, as well as in the master calendar, could be made using a single set of per-VC parameter blocks, as described previously. In this case, each slave calendar could be provided with its own individually-corresponding slave snoop memory for indicating whether each parameter block is currently in use as an entry in the corresponding slave calendar. This would enable transfer of a VC between the slave calendars to be accomplished simply and quickly just by altering one bit in each slave snoop memory.

Although the present invention has been described above in relation to the scheduling of ATM cell transmissions, it will be understood that in other embodiments the present invention can be applied in any situation in which it is required to schedule events.

What is claimed is:

1. Scheduling circuitry, for scheduling predetermined events, including:
a master calendar holding entries corresponding respectively to events that are to occur within a preselected master-calendar scheduling range;
a slave calendar holding entries corresponding respectively to events that are to occur beyond said scheduling range; and
calendar control circuitry operable, when an event is to be scheduled, to make an entry corresponding thereto in said slave calendar if the interval between a current time and a desired scheduling time for the event exceeds said scheduling range, said entry in said slave calendar including timing information representing said desired scheduling time, said calendar control circuitry being further operable to monitor the entries in said slave calendar and to cause an entry therein whose corresponding event becomes within said scheduling range to be transferred to said master calendar.

2. Circuitry as claimed in claim 1, wherein said calendar control circuitry is operable, during such event-scheduling, to make an entry corresponding to the event to be scheduled in said master calendar if said interval does not exceed said scheduling range.

3. Circuitry as claimed in claim 1, wherein a granularity of said timing information included in each said entry in said slave calendar is equal to a granularity with which said current time is measured.

4. Circuitry as claimed in claim 1, wherein said calendar control circuitry is operable, in the course of such monitoring of the entries in said slave calendar, to compare said desired scheduling time, as represented by the timing information included in such an entry, with said current time and to determine whether or not to effect such transfer in accordance with the result of the comparison.

5. Circuitry as claimed in claim 4, wherein said transfer is effected when the difference between said desired scheduling time, as represented by said timing information in the entry, differs from said current time by an amount less than or equal to the sum of said scheduling range and a preselected offset time.

6. Circuitry as claimed in claim 1, wherein said predetermined events include, for each of a plurality of different units, a series of events, and each said entry in said master calendar or in said slave calendar corresponds to the next event in such a series for one of said units.

7. Circuitry as claimed in claim 6, wherein said calendar control circuitry is operable to process the entries in said master calendar sequentially and, for each entry processed, to cause the corresponding event to take place and to delete the processed entry and to make a new entry in one of said master calendar and said slave calendar, said new entry corresponding to said next event in said series for the unit concerned.

8. Circuitry as claimed in claim 7, wherein said master calendar has a succession of storage locations corresponding respectively to a succession of time slots.

9. Circuitry as claimed in claim 8, wherein said timing information represents said desired scheduling time with at least a precision of an interval between successive ones of said time slots.

10. Circuitry as claimed in claim 8, wherein, in each said time slot, one entry in said master calendar is processed.

11. Circuitry as claimed in claim 8, wherein a plurality of such entries can be made at the same storage location.

12. Circuitry as claimed in claim 11, wherein said entries of said plurality are in the form of a linked list of entries.

13. Circuitry as claimed in claim 8, having an activity pointer for identifying that one of said storage locations of said master calendar currently being processed by said calendar control circuitry, and also having a time pointer for identifying that one of said storage locations of said master calendar whose corresponding time slot is at said current time.

14. Circuitry as claimed in claim 13, wherein said activity pointer is updated upon completion of the processing of said entry or, if more than one, all of said entries, at the storage location currently being processed, and said time pointer is updated in accordance with said current time.

15. Circuitry as claimed in claim 6, wherein each said unit of said plurality has its own individually-corresponding parameter block which can selectively constitute an entry in said master calendar or an entry in said slave calendar.

16. Circuitry as claimed in claim 15, further including an entry-type snoop circuit, accessible by said calendar control circuitry independently of said entries in said master calendar and said slave calendar indicating whether the parameter block corresponding to one of said units presently constitutes an entry in said master calendar or an entry in said slave calendar.

17. Circuitry as claimed in claim 16, wherein said entry-type snoop circuit serves to provide respective such indications simultaneously for a group of the parameter blocks.

18. Circuitry as claimed in claim 8, including a master snoop circuit indicating whether one of said storage locations of said master calendar presently has such an entry therein.

19. Circuitry as claimed in claim 18, wherein said master snoop circuit serves to provide respective such indications simultaneously for a group of said storage locations.

20. Circuitry as claimed in claim 1, having such a master calendar and such a slave calendar for each of a plurality of different priority levels of said events.

21. Circuitry as claimed in claim 20, wherein each priority level has its own current time independent of the current time of each other priority level, and said calendar control circuitry is operable to suspend processing of entries in said master calendar for a particular priority level if said master calendar for any higher priority level has an entry corresponding to an event whose said desired scheduling time is behind or equal to said current time for that priority level.

22. Circuitry as claimed in claim 1, wherein:
said slave calendar includes respective first-order and second-order slave calendars;
said calendar control circuitry is operable, during such event-scheduling, to make an entry corresponding to the event in the second-order slave calendar if said interval between said current time and said desired scheduling time for that event exceeds a threshold value that is greater than said master-calendar scheduling range, and to make an entry corresponding to said event in the first-order slave calendar if said interval exceeds said master-calendar scheduling range but is no greater than said threshold value; and
said calendar control circuitry is also operable to monitor the entries in both the first-order and second-order slave calendars and to cause an entry in the second-order slave calendar whose corresponding event has become closer in time than said threshold value to be transferred to the first-order slave calendar and to cause an entry in the first-order slave calendar whose corresponding event has become within the master-calendar scheduling range to be transferred to said master calendar.

23. Circuitry as claimed in claim 1, wherein said events are respective cell transmission operations in an ATM network.

24. Circuitry as claimed in claim 6, wherein said units are respective virtual channels of an ATM network.

25. A scheduling method, for scheduling predetermined events, wherein:

when an event is to be scheduled, making an entry corresponding thereto in a master calendar if the interval between a current time and a desired scheduling time for the event is within a preselected master-calendar scheduling range, and if said interval exceeds said preselected scheduling range, an entry corresponding to the event is made in a slave calendar separate from the master calendar, said entry in said slave calendar including timing information representing said desired scheduling time; and monitoring the entries in the slave calendar and transferring any entry therein whose corresponding event becomes within said master-calendar scheduling range, the master calendar.

26. Scheduling circuitry for scheduling predetermined events, including:

master calendar means for holding entries corresponding respectively to events that are to occur within a preselected master-calendar scheduling range;

slave calendar means for holding entries corresponding respectively to events that are to occur beyond said scheduling range; and calendar control means operable, when an event is to be scheduled, to make an entry corresponding thereto in said slave calendar means if the interval between a current time and a desired scheduling time for the event exceeds said scheduling range, said entry in said slave calendar means including timing information representing said desired scheduling time, said calendar control means being further operable to monitor the entries in said slave calendar means and to cause an entry therein whose corresponding event becomes within said scheduling range, to be transferred to said master calendar means.

27. A scheduling method, for scheduling predetermined events, wherein:

when an event is to be scheduled, an entry corresponding thereto is made in master calendar means if the interval between a current time and a desired scheduling time for the event is within a preselected master-calendar scheduling range, and if the interval exceeds the preselected scheduling range, an entry corresponding to the event is made in slave calendar means separate from the master calendar means, the entry in the slave calendar means including timing information representing the desired scheduling time; and the entries in the slave calendar means are monitored and any entry therein whose corresponding event becomes within the master-calendar scheduling range is transferred to the master calendar means.

28. Circuitry for scheduling predetermined events, comprising:

a first calendar holding entries corresponding respectively to events that are to occur within a scheduling range;

a second calendar holding entries corresponding respectively to events that are to occur beyond the scheduling range; and a calendar control circuit making an entry corresponding to an event in the second calendar if the interval between a current time and a desired scheduling time for the event exceeds the scheduling range, the entry in the second calendar including timing information representing the desired scheduling time, the calendar control circuit monitoring entries in the second calendar and causing an entry therein whose corresponding event comes within the scheduling range, to be transferred to the first calendar.

29. A method for scheduling predetermined events, comprising:

making an entry corresponding to an event which is to be scheduled, in a first calendar if an interval between a current time and a desired scheduling time for the event is within a scheduling range;

making an entry corresponding to an event which is to be scheduled, in a second calendar if the interval between the current time and the desired scheduling timing for the event exceeds the scheduling range, the entry in the second calendar including timing information representing the desired scheduling time; and monitoring the entries in the second calendar and transferring to the first calendar any entry in the second calendar whose corresponding event becomes within the scheduling range.

* * * * *

UNITED STATES PATENT AND TRADEMARK OFFICE
CERTIFICATE OF CORRECTION

PATENT NO. : 6,810,043 B1
DATED : October 26, 2004
INVENTOR(S) : Finbar Naven et al.

It is certified that error appears in the above-identified patent and that said Letters Patent is hereby corrected as shown below:

Column 17,
Line 29, before "the" insert -- to --.

Signed and Sealed this

Tenth Day of May, 2005

JON W. DUDAS
*Director of the United States Patent and Trademark Office*